United States Patent
Morita et al.

(10) Patent No.: US 7,762,584 B2
(45) Date of Patent: Jul. 27, 2010

(54) ACTUATOR WHICH HAS AN OPERATING PIN

(75) Inventors: Bunpei Morita, Aichi-ken (JP); Naohiko Ishiguro, Aichi-ken (JP); Michihisa Asaoka, Aichi-ken (JP); Shun Ito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 136 days.

(21) Appl. No.: 12/230,964

(22) Filed: Sep. 9, 2008

(65) Prior Publication Data
US 2009/0079175 A1    Mar. 26, 2009

(30) Foreign Application Priority Data
Sep. 20, 2007  (JP)  ............................... 2007-244242
Jun. 24, 2008  (JP)  ............................... 2008-164787

(51) Int. Cl.
B60R 21/239   (2006.01)
(52) U.S. Cl. ..................... 280/739; 280/743.2; 102/531
(58) Field of Classification Search .................. 280/741, 280/739, 737, 736, 806, 743.2; 102/530, 102/531; 297/480
See application file for complete search history.

(56) References Cited

U.S. PATENT DOCUMENTS 6,513,835 B2    2/2003   Thomas
2002/0135166 A1*  9/2002  Thomas ...................... 280/735

FOREIGN PATENT DOCUMENTS

JP      A-2006-297957    10/2006
JP      A-2007-91083      4/2007

* cited by examiner

*Primary Examiner*—Paul N Dickson
*Assistant Examiner*—Keith Frisby
(74) *Attorney, Agent, or Firm*—Posz Law Group, PLC

(57) ABSTRACT

An actuator which has an operating pin of the invention includes a piston which has an operating pin, a squib, and a cylinder case for holding the piston, in which the piston is moved rearward along with the operating pin by a driving gas generated injected from the squib into the cylinder case. A cap portion for covering the side of the squib with a gas injection port comprises a cylindrical side portion and a front end wall portion, and the operating pin is projected from the center of this front end wall portion. The cap portion is arranged with injection holes through which the driving gas is injected. Forward movement of the piston before the actuator is operated is restricted by the front end wall portion of the cylinder case coming into contact with the ceiling wall portion of the cylinder case.

9 Claims, 8 Drawing Sheets

ACTUATOR WHICH HAS AN OPERATING PIN

The present application claims priority from Japanese Patent Applications No. 2007-244242 of Morita et al., filed on Sep. 20, 2007, and No. 2008-164787 of Ishiguro et al., filed on Jun. 24, 2008, the disclosures of which are hereby incorporated into the present application by reference.

BACKGROUND OF THE INVENTION

1. Field of the Invention

The present invention relates to an actuator capable of being moved to draw an operating pin along an axial direction while being operated and relates to an actuator which when being operated needs to enable an operating pin to be operated instantaneously, such as one utilized for controlling pressure inside of an airbag or controlling the shape of an airbag which is mounted in a vehicle.

2. Description of the Related Art

There is an actuator of a related art shown in US Patent Publication No. 2002/0135166. According to the actuator of the related art, a piston held inside of a cylinder case to project an operating pin outward is moved rearward inside of the cylinder case along with the operating pin by utilizing a driving gas generated when a squib provided at the piston is operated. Further, in the actuator of the related art, the cylinder case is provided with a side wall portion surrounding the piston and a ceiling wall portion closing the front end side of the side wall portion and projecting the operating pin outward. When operated, the squib is constituted to inject the driving gas into the cylinder case from an injection hole formed at a cap portion of the piston arranged to cover the squib. Further, the operating pin projected from the ceiling wall portion is constituted to move rearward along with the piston by means of the driving gas injected from the injection hole of the cap portion when the squib is operated. Further, in the actuator of the related art, the piston is contained inside of the cylinder case which is kept by a positioning member from moving rearward before being operated.

However, according to the actuator of the related art, only the rearward movement of the piston before being operated is restricted by the positioning member arranged at a position where it is exposed outward from the cylinder case constituting a front end side of the operating pin. Therefore, the piston is liable to be moved before being operated and forward movement of the piston cannot firmly be restricted until it is operated. Further, in the actuator of the related art, the injection hole provided at the cap portion of the piston is constituted to inject the driving gas along a direction orthogonal to an axis of the operating pin. Further, in the actuator of the related art, the injection hole is disposed at a vicinity of the ceiling wall portion of the cylinder case before the actuator is operated. Therefore, when the piston is moved forward before operation, there is a concern that the injection hole will move toward the ceiling wall portion and be closed by the ceiling wall portion, and so there is a room for improvement to ensure that the driving gas is swiftly injected from the injection hole and the operating pin is swiftly moved rearward upon operation.

SUMMARY OF THE INVENTION

It is an object of the invention to provide an actuator which has an operating pin capable of reliably preventing a forward movement of a piston before the actuator is operated and the operating pin swiftly moving rearward when the actuator is operated.

The object of the invention can be achieved by an actuator which has an operating pin which has the below-described constitution.

A piston which has an operating pin, a squib which can generate driving gas upon being ignited when the actuator is operated, and a cylinder case for holding the piston; wherein the piston is connected to the squib and projects the operating pin outward from the front end of the piston;

the cylinder case includes a side wall portion substantially in a cylindrical shape which surrounds the piston, and a ceiling wall portion constituted to close the front end side of the side wall portion and to allow the operating pin to project outward;

the piston is moved rearward along with the operating pin by injection of the driving gas generated from the squib into the cylinder case when the actuator is operated;

the piston includes a cap portion capable of covering the side of the squib by the gas injection port;

the cap portion comprises a cylindrical portion capable of covering the side of the squib in all directions orthogonal to the axis of the squib and a front end wall portion formed to close the front end side of the cylindrical portion, and the operating pin which has a diameter smaller than an outer diameter of the front end wall portion is constituted to project from the center of the front end wall portion;

around the operating pin of the cap portion is arranged a plurality of injection holes capable of injecting the driving gas from the gas injection port into the space between the front end wall portion and the ceiling wall portion inside the cylinder case; and movement of the piston toward the front before the actuator is operated is restricted because the front end wall portion of the piston comes in contact with the ceiling wall portion of the cylinder case.

In the actuator which has an operating pin of the invention, the piston is contained inside the cylinder case so that the front end wall portion of the piston is brought into contact with the ceiling wall portion of the cylinder case. Therefore, the forward movement of the piston and the operating pin before the actuator is operated can reliably be prevented. Further, in the actuator which has the operating pin of the invention, when the actuator is operated, the driving gas from the gas injection port of the squib is injected through the injection holes formed around the operating pin of the cap portion into the space between the front end wall portion and the ceiling wall portion inside the cylinder case. Therefore, even when the front end wall portion of the piston is arranged to be brought into contact with the ceiling wall portion, the driving gas can be injected from the injection holes into the space between the front end wall portion and the ceiling wall portion. As a result, in the actuator which has the operating pin of the invention, the piston can swiftly be moved rearward by the pressure of the driving gas filling the space between the cylinder case and the piston.

Therefore, in the actuator which has an operating pin of the invention, the forward movement of the piston before the actuator is operated can reliably be stopped, and the operating pin can swiftly be moved rearward when the actuator is operated.

Further, in the actuator which has an operating pin of the invention, it is preferable that the injection holes be formed in the front end wall. When an actuator with such a configuration is operated, the driving gas from the gas injection port of the squib can be injected through the injection holes into the cylinder case in the direction of the ceiling wall. Therefore, the reaction force from the injection of the driving gas can be utilized in addition to the pressure of the driving gas filling between the cylinder case and the piston. As a result, in comparison with the case of forming an injection hole in the cylindrical wall, the operating pin can swiftly be moved rearward.

Further, in the actuator which has an operating pin of the above-described constitution, it is preferable that the injection holes be constituted to be able to inject the driving gas along the axial direction of the operating pin. In the actuator which has an operating pin of such a constitution, the driving gas injected from the squib is injected from the injection holes into the cylinder case in line with the axial direction of the operating pin, that is, so that it presses the ceiling wall portion in the axial direction of the operating pin. Therefore, the piston can swiftly be moved rearward, away from the ceiling wall portion due to the reaction force from the driving gas and the operating pin can further swiftly be moved rearward.

Furthermore, in the actuator which has an operating pin of the above-described constitution, it is preferable that the operating pin and the cap portion are constituted as an integral product formed by pressing a metal material. When the actuator which has an operating pin is given such a configuration, the sealing performance of the cap portion of the piston can be improved, and further, in comparison with the case of making the operating pin and the cap member separately, the number of parts can be reduced.

Furthermore, in the actuator which has an operating pin of the above-described configuration, it is preferable that the cap portion be connected to the squib by crimping. When the actuator which has an operating pin is constructed in such a way, the piston can be connected to the squib by a simple constitution.

Furthermore, in the actuator which has the operating pin of the above-described configuration, it is preferable that the operating pin is made hollow up to its front end face, its wall being continuous with the cap portion. In the actuator which has an operating pin of such a configuration, the wall thickness of the cap portion and of the operating pin can be made substantially uniform. Therefore, the cap portion and the operating pin can be fabricated by pressing a sheet metal material which has a constant plate thickness, and in comparison with the case of fabricating the operating pin by pressing so that the operating pin is solid over its entire length, the operating pin can easily be fabricated. As a result, fabrication cost can be reduced.

Furthermore, in the actuator which has an operating pin of the above-described constitution, it is preferable that the cylindrical portion of the cap portion includes a large diameter portion at the rear side toward the squib, and a small diameter portion at the front end side with a smaller outer diameter than that of the large diameter portion;

wherein the small diameter portion is configured to have an outer diameter sufficiently smaller than the outer diameter of the side wall portion that there can be provided a gap between the small diameter portion and the side wall portion of the cylinder case; and wherein a seal ring is interposed between the small diameter portion and the side wall portion.

When the actuator which has an operating pin has the above-described configuration, airtightness between the piston and the side wall portion of the cylinder case can be ensured, and when operating the squib, the driving gas can be prevented from leaking from between the side wall portion of the cylinder case and the cylindrical portion of the piston. Further, in the actuator which has an operating pin of the above-described constitution, the seal ring can be arranged by simply fitting the seal ring around the small diameter portion of the piston and bringing the ring into contact with the large diameter portion. Therefore, a recessed portion for holding the seal ring need not be formed at the squib or the piston by machining or the like and the seal ring need not be enlarged in diameter temporarily and then fitted in such a recessed portion. As a result, in comparison with the case where a recessed portion for holding the seal ring is made at the squib or the piston, the number of fabrication steps and the fabrication cost can be reduced.

Furthermore, in the actuator which has an operating pin of the above-described configuration, it is preferable to arrange a seal ring which seals the gap between the operating pin and an inserting portion in which the operating pin is inserted on the inner face of the ceiling wall portion; and for the actuator to have a configuration such that the front end wall portion of the piston comes into contact with the ceiling wall portion with the seal ring interposed between.

In the actuator which has an operating pin of the above-described constitution, the gap between the operating pin and the inserting portion at the ceiling wall portion in which the operating pin is inserted is always sealed by the seal ring when the actuator is mounted in the vehicle, and therefore, durability against humidity or the like is improved.

Further, it is preferable to utilize the actuator which has an operating pin of the invention for controlling the inner pressure of an airbag of an airbag apparatus mounted in a vehicle.

DESCRIPTION OF THE PREFERRED EMBODIMENTS

Hereinafter, an embodiment of the invention will be explained with reference to the drawings. However, the invention is not limited to the embodiments disclosed herein. All modifications within the appended claims and equivalents relative thereto are intended to be encompassed in the scope of the claims.

Figure 1:
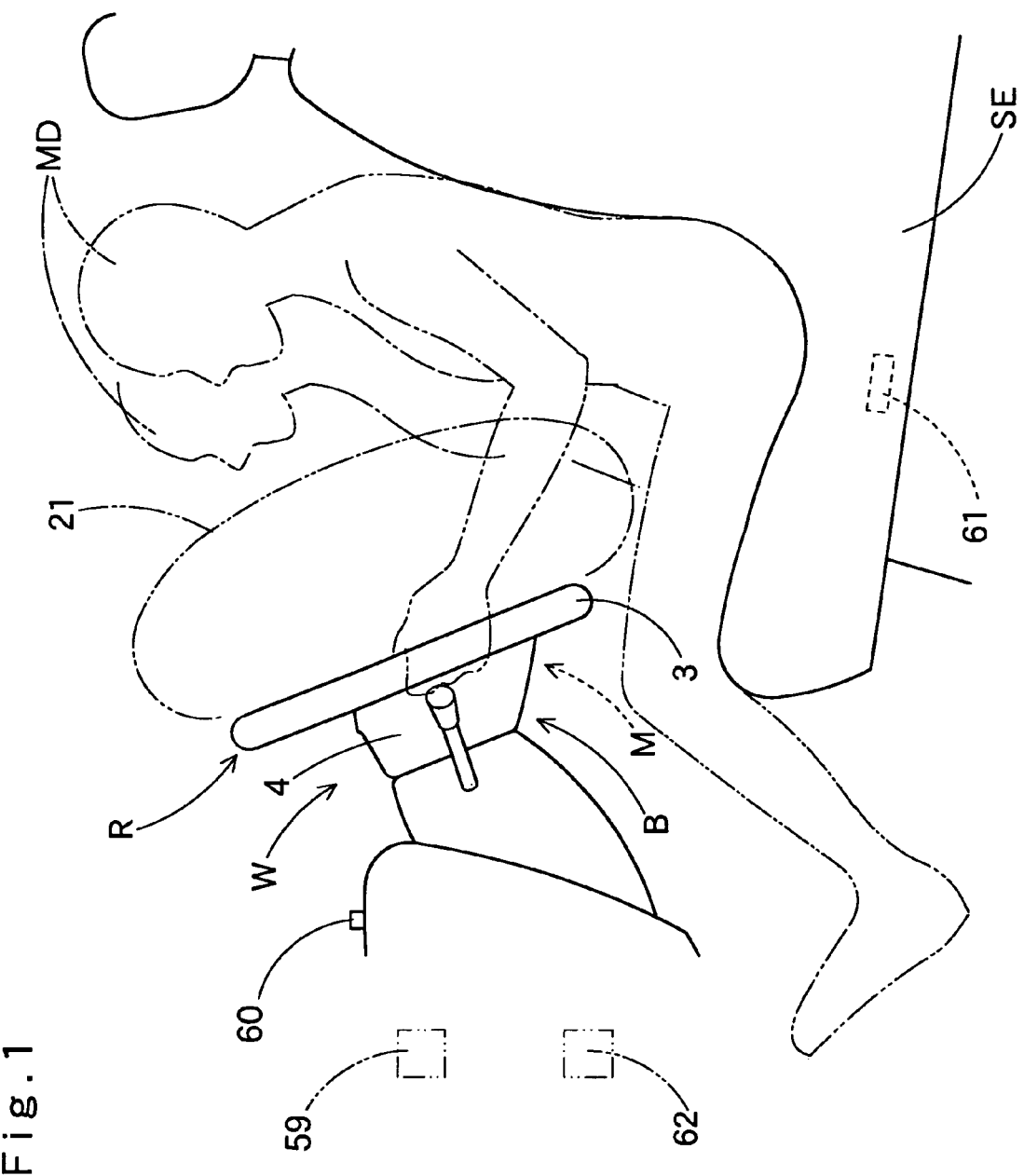
FIG. 1 is a view for explaining an airbag apparatus for a steering wheel in which an actuator is used which is an embodiment of the invention.

An embodiment of the invention will be explained in reference to the drawings as follows. An actuator A1 according to an embodiment (refer to FIGS. 2 through 4) is arranged in an airbag apparatus M mounted in a steering wheel W as shown in FIG. 1. The actuator A1 is configured to be operated along with an inflator 8 of the airbag apparatus M by a control device 59 shown in FIG. 1.

Here, the up and down direction and left and right direction in the embodiment are in reference to the steering wheel W mounted to a vehicle when steering straight forward, if not specified otherwise. In this embodiment, the up and down direction coincides with the axial direction of the steering shaft SS (refer to two-dotted chain line of FIG. 2) integrated with the steering wheel W. The left and right direction is the direction orthogonal to the axial direction of the steering shaft SS to the left and right. Further, the front and rear directions of the embodiment are the reverse of the front and rear sides of actual vehicle, for purposes of explanation. Specifically, according to the embodiment, the rear direction is the direction in which the piston in the actuator A1 moves, arranged such that the axial direction of the piston is aligned with a direction orthogonal to the axial direction of the steering shaft SS.

The control device 59 is electrically connected to a passenger detecting sensor capable of detecting the shape or seating position of a driver (passenger) MD seated on a seat SE, for example, a position detecting sensor 60 capable of detecting the distance between the steering wheel W and the driver MD, or a weight detecting sensor 61 capable of detecting a weight of the driver MD. Further, the control device 59 is electrically connected to an impact detecting sensor 62 capable of detecting the degree or direction of acceleration of the vehicle. Further, the control device 59 inputs an electric signal from the position detecting sensor 60, the weight detecting sensor 61, or the impact detecting sensor 62 and operates the inflator 8 and the actuator A1. Further, in the case of the embodiment, the actuator A1 is operated by the control device 59 to inflate an airbag 21 adequately according to the circumstance when the airbag apparatus M is operated. Specifically, the actuator A1 is operated to be able to restrain the increase in an inner pressure of the airbag 21 and exhaust inflation gas flowing inside of the airbag 21 to the outside of the airbag 21 when the airbag 21 is inflating.

Figure 2:
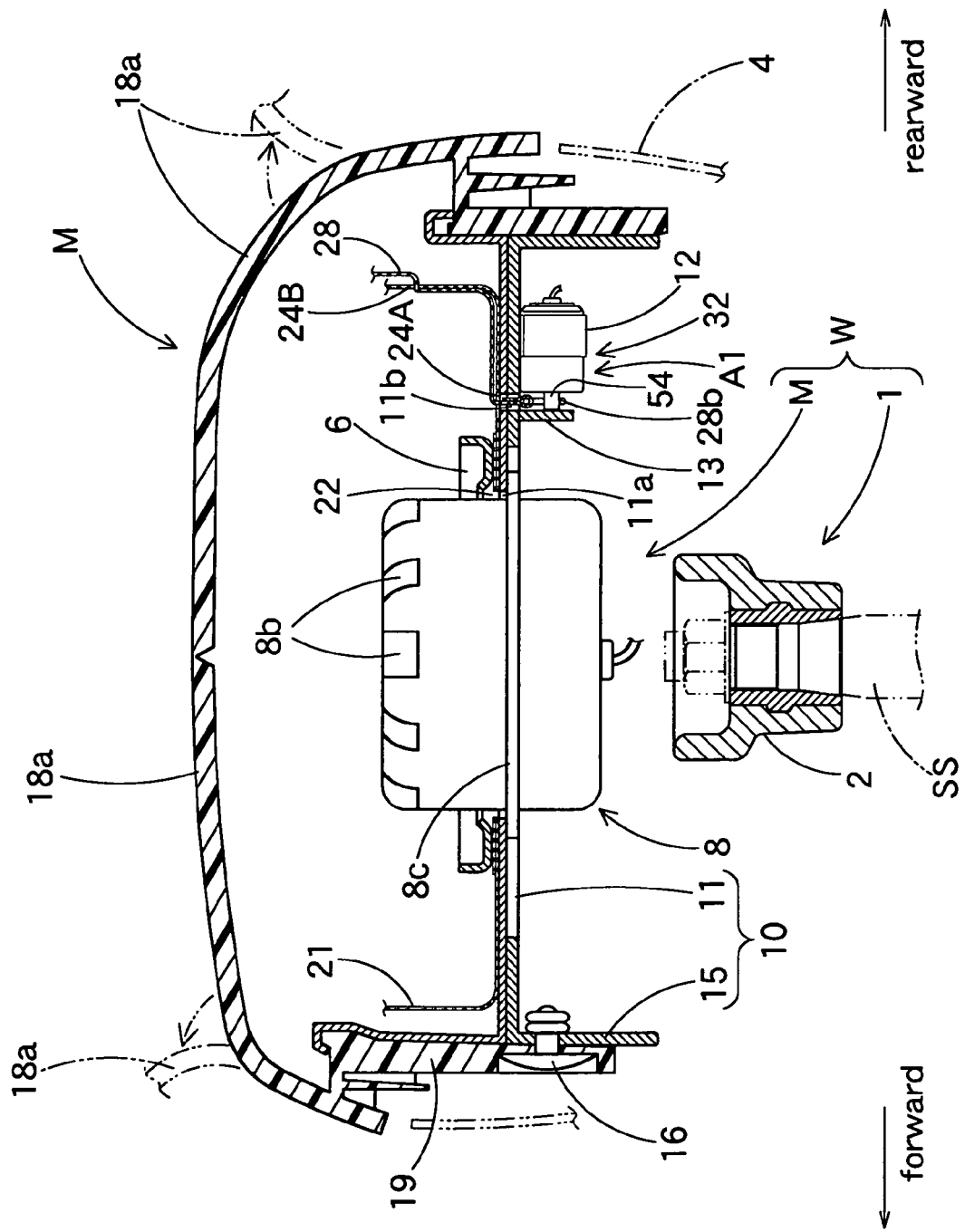
FIG. 2 is a vertical sectional view of an airbag apparatus for a steering wheel in which an actuator of an embodiment is used.

Further, as shown by FIGS. 1 and 2, the airbag apparatus M is arranged at the upper portion of a boss portion B at the center of the steering wheel W. The steering wheel W comprises a ring portion R grabbed when steering, a boss portion B arranged at the center and connected to the steering shaft SS (refer to two-dotted chain line of FIG. 2), and a predetermined number of spoke portions, not illustrated, connecting the boss portion B and the ring portion R. Further, the constituent parts of the steering wheel W can be divided into an airbag apparatus M and the steering wheel main body 1.

The steering wheel main body 1 includes a core metal 2, a cover layer 3, and a lower cover 4. The core metal 2 is an aluminum alloy or the like, arranged to connect each of the portions of the ring portion R and the boss portion B and the like. The cover layer 3 is made of a synthetic resin for covering the core metal 2 at the ring portion R and the spoke portion, not illustrated. The lower cover 4 is made of a synthetic resin and is arranged below the boss portion B.

As shown by FIG. 2, the airbag apparatus M includes the airbag 21, the inflator 8, a bag holder 10 and a pad. The airbag 21 is folded and housed in the bag holder 10. The inflator 8 supplies the inflation gas to the airbag 21. The bag holder 10 constitutes a case which fixedly holds the airbag 21 and the inflator 8. The pad 17 covers the upper side of the airbag 21 which is held to a side wall portion 15 of the bag holder 10 and folded. The pad 17 constitutes an airbag cover.

The inflator 8 includes a main body portion 8a and a flange portion 8c. The main body portion 8a is substantially the shape of a circular pillar and has at an upper portion thereof a plurality of gas injection ports 8b through which the inflation gas is injected. The flange portion 8c is a substantially square plate and is arranged to project from the outer side face of the main body portion 8a. The flange portion 8c is formed with an insertion hole, not illustrated. The insertion hole is for inserting a bolt 6a (refer to FIG. 3) projected from a retainer 6, mentioned later.

The retainer 6 is made of sheet metal and is substantially a square ring. The retainer 6 includes bolts 6a at four corners thereof, projecting through the lower side. Each of the bolts 6a of the retainer 6 projects from the flange portion 8c of the inflator 8 and passes through the wall at the periphery of an inflow opening 22 at the inner surface of the airbag 21 and through the bag holder 10. Further, by fastening nuts 7 to the respective bolts 6a and utilizing a retainer 6, the airbag 21 and the inflator 8 are attached to the bag holder 10.

The bag holder 10 includes a bottom wall portion 11 plate substantially in a shape of a square and a side wall portion 15 extended above and below a peripheral edge of the bottom wall portion 11. Near the center of the bottom wall portion 11, an insertion hole 11a is formed in a circular shape. The insertion hole 11a is for inserting the main body portion 8a of the inflator 8 from below to extend above the bottom wall. In the periphery of the insertion hole 11a are formed four insertion holes, not illustrated. The insertion holes are for inserting respective bolts 6a of the retainer 6. Further, an insertion hole 11b is formed to the rear of the insertion hole 11a of the bottom wall portion 11. The insertion hole 11b is for inserting a loop portion 28b locked by an operating pin of the actuator A1.

Figure 3:
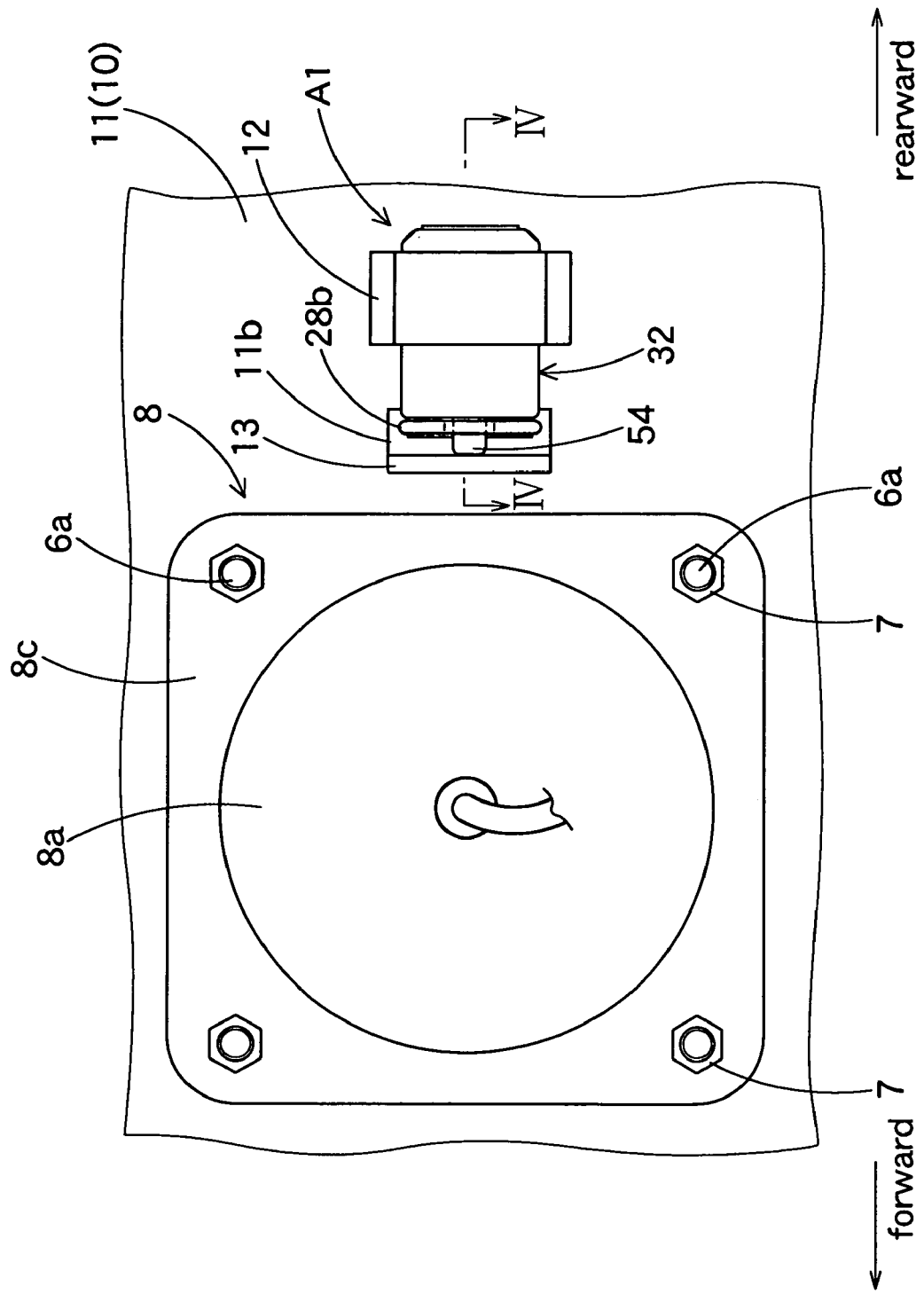
FIG. 3 is a partial bottom view of an airbag apparatus for a steering wheel in which an actuator of an embodiment is used.
Figure 4:
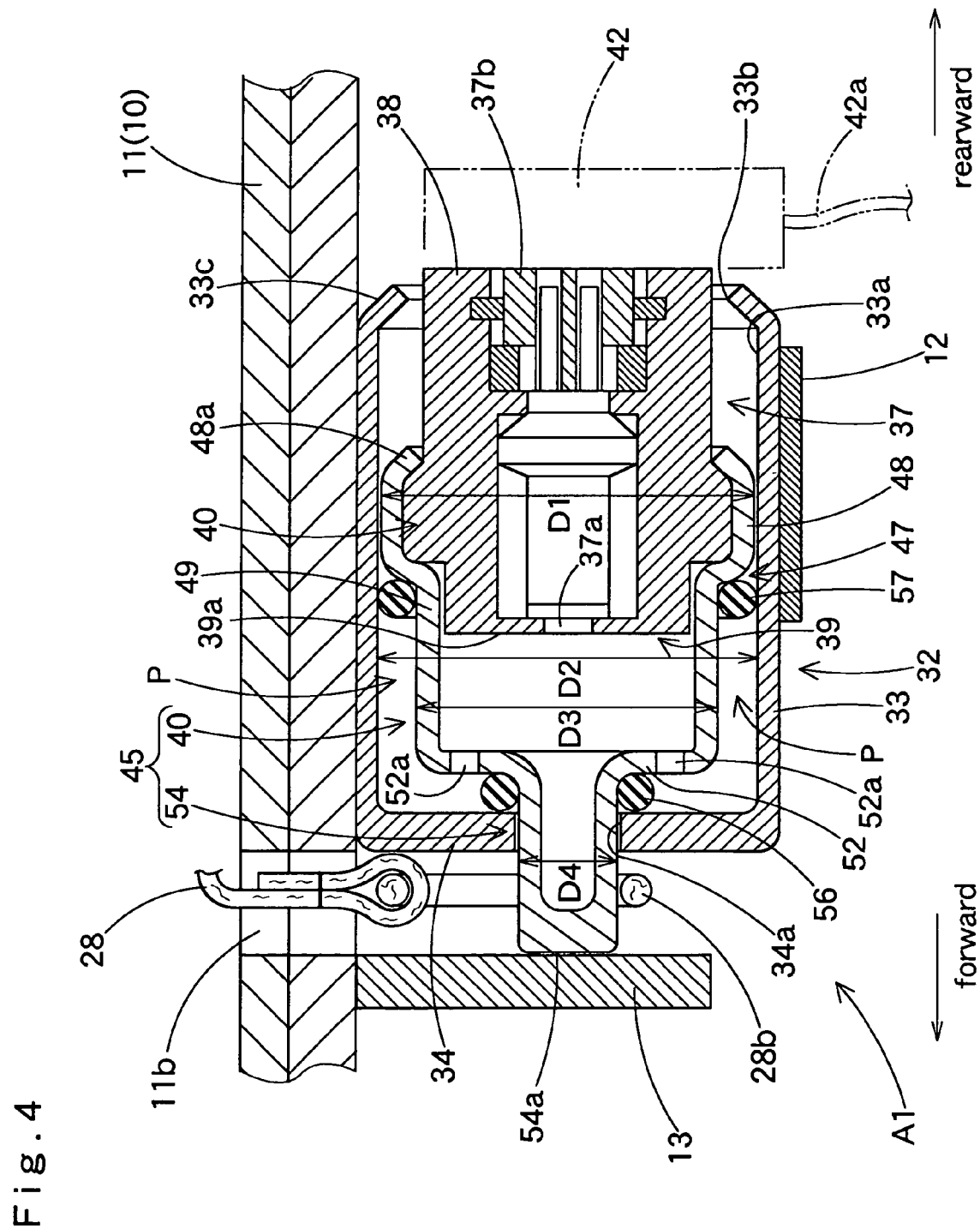
FIG. 4 is a vertical sectional view of the actuator of the embodiment along IV-IV of FIG. 3.

Further, as shown in FIGS. 2 through 4, below the bottom wall portion 11 is arranged an attaching bracket 12 and a support piece portion 13. The attaching bracket 12 is for holding the actuator A1. The support piece portion 13 is arranged at the front end face 54a of an operating pin 54 of the actuator A1. The support piece portion 13 is a member for supporting the front end face 54a of the operating pin 54 when fixing the loop portion 28b.

The side wall portion 15 of the bag holder 10 is fastened to a side wall portion 19 of the pad 17 by a rivet 16. Further, the side wall portion 15 is formed with a bracket, not illustrated, fixed to the core metal 2 of the steering wheel main body 1.

The pad 17 is formed from a synthetic resin such as an olefin thermoplastic elastomer. As shown in FIG. 2, the pad 17 includes a ceiling wall portion 18 for covering an upper side of the boss portion B and a side wall portion 19 extending downward from an outer peripheral edge of the ceiling wall portion 18. The side wall portion 19 is substantially the shape of a square cylinder. The portion of the ceiling wall portion 18 to the inside of the side wall portion 19 is configured to cover the folded airbag 21. Further, the portion of the ceiling wall portion 18 to the inside of the side wall portion 19 is arranged with two door portions 18c which open to the front and rear when pressed by the inflating airbag 21. The side wall portion 19 is attached to the side wall portion 15 of the bag holder 10 by the rivet 16 as described above.

Figure 5A:
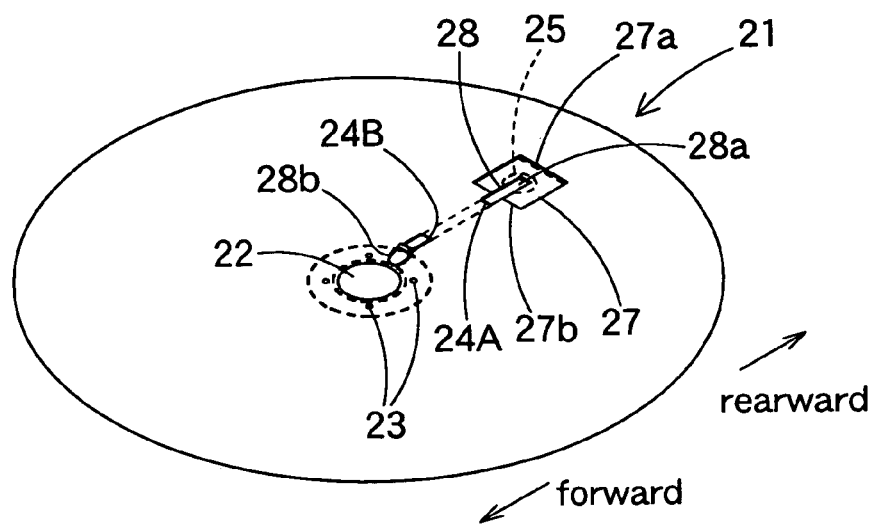
FIGS. 5A, 5B, and 5C are views showing a surrounding of an exhaust hole of an airbag the operation of which is controlled by an actuator of an embodiment.
Figure 5B:
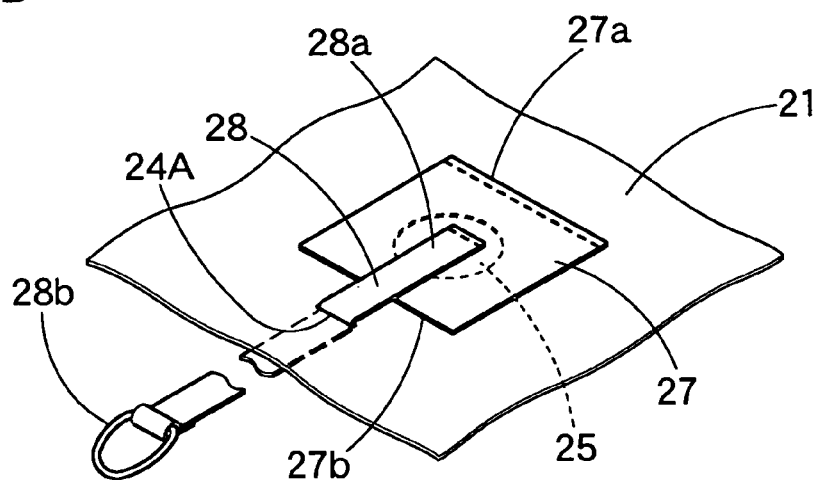
Figure 5C:
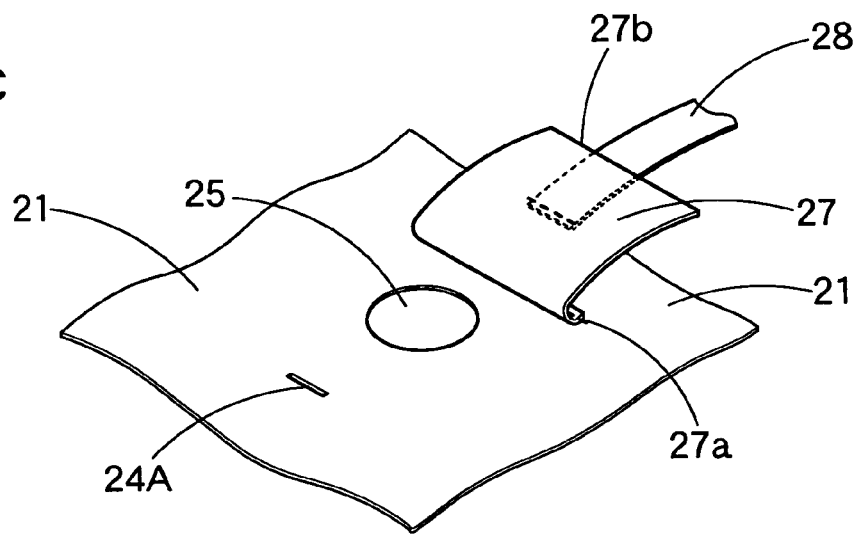

The airbag 21 is made from a woven cloth which has flexibility, of polyamide or polyester thread. As shown by the two-dot and dash line of FIG. 1, the airbag 21 is made to expand into a bag shape by having inflation gas flow therein. As shown by FIG. 2 and FIGS. 5A, 5B, and 5C, the airbag 21 includes an inflow opening 22 through which the inflation gas flows. In the inflow opening 22 is inserted the main body portion 8a of the inflator 8 from below. Further, the bag-expanding gas injected from the gas injection port 8b of the inflator 8 is made to flow inside the airbag 21 by way of the inflow opening 22. Further, in the periphery of the inflow opening 22 are formed four attaching holes 23 (refer to FIGS. 5A, 5B, 5C). The attaching hole 23 is for insertion of the bolt 6a formed at the retainer 6. Further, as shown in FIGS. 5A, 5B, 5C, in a portion of the airbag to the rear of the inflow opening 22 is formed an exhaust hole 25 opened in a circular shape. Insertion holes 24A and 24B are formed between the exhaust hole 25 and the inflow opening 22. The insertion holes 24A and 24B are made into the shape of a slit extending to the left and right to allow insertion of a belt 28. The insertion hole 24A is formed near the front edge of the exhaust hole 25. The insertion hole 24B is formed near the rear edge of the inflow opening 22.

The outer peripheral face side of the airbag 21 is arranged with a flap 27 to close the exhaust hole 25 (refer to FIGS. 5A, 5B, 5C). In the case of the embodiment, the flap 27 is connected to the airbag by the exhaust hole 25, on the side opposite from the inflow opening 22 (rear edge side). Specifically, the flap 27 is made from a woven cloth which has flexibility, of polyamide or polyester thread, like the airbag 21. The flap 27 is substantially of a rectangular shape capable of closing the exhaust hole 25. The flap 27 is connected to the airbag 21 at the edge opposite from the inflow opening 22 (in the case of the embodiment, to the rear). Further, the edge of the flap 27 connected to the airbag 21 constitutes a hinge portion 27a. The flap 27 is constituted to open from the front end 27b opposite from the hinge portion 27a (the side toward the inflow opening 22) when pushed by the inflation gas which flows out from the exhaust hole 25.

The flap 27 is coupled with the front end 28a of the belt 28. The belt 28 is formed from a cloth of polyester thread which has flexibility. The belt 28 is arranged to extend from the hinge portion 27a of the flap 27 to the front end 27b opposite to the hinge portion 27a. That is, in the case of the embodiment, the belt 28 is arranged in the longitudinal direction, toward the front and rear. The end portion of the belt 28 at the inflow opening 22 (at the root) is arranged with a loop portion 28b substantially in a shape of a circular ring. As shown in FIGS. 2 through 4, in the state before operation of the actuator A1, in the loop portion 28b is inserted an operating pin 54. In the case of the embodiment, the loop portion is made from a material which has flexibility. The loop portion 28b is constituted to be able to be inserted into the insertion hole 24B provided at the airbag 21 when the airbag 21 is inflated and the operating pin 54 is withdrawn from the loop portion 28b. Further, when the airbag 21 is inflated in a state while the operating pin 54 engages the loop portion 28b, the front end 27b of the flap 27 is held down by the belt 28 inserted through the insertion hole 24A. Then, as shown in FIG. 5B, the airbag 21 is inflated with the exhaust hole 25 closed by the flap 27. On the other hand, when the airbag 21 is expanded and the operating pin 54 is drawn out from the loop portion 28b by the actuator A1, the flap 27 is pushed out by the inflation gas which flows out from the exhaust hole 25. Then, the belt 28 is drawn out through the through holes 24A and 24B and, as shown by FIG. 5C, the flap 27 is opened to open the exhaust hole 25. Therefore, the inflation gas flows out from the exhaust hole 25 to the outside of the airbag 21, and an increase in the inner pressure of the airbag 21 can be restrained.

Further, an operation of the actuator A1 for releasing the loop portion 28b of the belt 28 from being engaged is controlled by the control device 59. Specifically, the control device 59 operates the actuator A1 when the control device 59 detects that the driver MD is excessively proximate to the steering wheel W based on a signal from the position detecting sensor 60, or when it detects that the driver MD is small-sized based on a signal from the weight detecting sensor 61. Specifically, the control device 59 reduces the inner pressure of the airbag 21 while being inflated by operating the actuator A1 simultaneously with the airbag apparatus M or with a slight delay.

As shown in FIG. 4, the actuator A1 comprises a piston 45 which has an operating pin 54, a squib 37 made to be able to generate driving gas G when operated by being ignited, and a cylinder case 32 for holding the piston 45. In the case of the embodiment, the squib 37 is arranged integrally with the piston 45. Further, in the case of the embodiment, the operating pin 54 is moved rearward to be drawn inside the cylinder case 32 along the axial direction (front and rear direction) of the cylinder case 32 when the actuator A1 is operated. Further, the actuator A1 is fixedly attached at a position to the rear of the insertion hole 11a of the bottom wall portion 11 of the bag holder 10 with an attaching bracket 12. The attaching bracket 12 is arranged to surround the side wall portion 33 of the cylinder case 32.

The cylinder case 32 is made by a sheet metal. In the case of the embodiment, the cylinder case 32 includes the side wall portion 33 in a shape of a circular cylinder surrounding the piston 45 and a ceiling wall portion 34 substantially in a circular shape for closing the front end of the side wall portion 33. In the side wall portion 33, a large diameter portion 48 of a cap portion 46, mentioned later, at the piston 45 can be slidable on an inner surface 33a. The side wall portion 33 is arranged so that its axial direction is in line with the front and rear direction. In the center of the ceiling wall portion 34 is formed an opening 34a substantially in a circular shape. The opening 34a is for projecting the operating pin 54. Further, the root side (rear) of the side wall portion 33 of the cylinder case 32 is left opened. This is for exposing the terminal 37b side of the squib 37 connected to the rear end side of the piston 45. Further, the root portion side (rear) of the side wall portion 33 is formed with a stopper 33c. The stopper 33c is for preventing the piston 45 from being drawn from the cylinder case 32 when the piston 45 is moved. Specifically, the stopper 33c is formed by constituting a section of the cylinder wall substantially in a taper shape to contract the diameter of the root portion end 33b (rear end) of the side wall. Specifically, the stopper 33c prevents the piston 45 from being drawn out from the cylinder case 31 when the piston 45 is moved rearward to draw in the operating pin 54 by bringing the large diameter portion 48 of the cap portion 46, mentioned later, into contact with the stopper 33c (refer to FIG. 6B). In the case of the embodiment, the stopper 33c is formed by crimping the root end portion 33b of the side wall portion 33 after inserting the piston 45 integrated with the squib 37 inside the cylinder case 31 when fabricating the actuator A1.

The squib 37 comprises an initiator and a holder for holding the initiator, and so is substantially in the shape of a circular pillar. Specifically, the squib 37 includes a main body portion 38 substantially in the shape of a circular pillar, a head portion 39 arranged on the front end of the main body portion 38, and a flange portion 40 arranged between the head portion 49 and the main body portion 38. The diameter of the head portion 39 is made to be smaller than that of the main body portion 38. The flange portion 40 is constituted to project outwardly in all directions orthogonal to the axis of the main body portion 38 so that its diameter is larger than that of the main body portion 38. Further, a gas injection port 37a is arranged at the front end 39a of the head portion 39 of the squib 37. Further, the terminal 37b is arranged on a root portion end side (rear end) of the main body portion 38 of the squib 37. In the case of the embodiment, the squib 37 is held by the piston 45 and is moved rearward along with the piston 45 when the piston 45 is moved rearward. The side of the squib 37 toward the gas injection port 37a is covered by the cap portion 46 of the piston 45. Further, the squib 37 exposes the terminal 37b from the piston 45. Specifically, the squib 37 is integrated to the piston 45 as follows. The root portion end 48a of the large diameter portion 48 of the cap portion 46 of the piston 45 is crimped at the rear of the flange portion 40 so as to contract the diameter of the cap portion 46. Further, the flange portion 40 is squeezed by the root portion end 48a. Further, in the squib 37, the whole head portion 39 is covered by the cap portion 46 and the main body portion 38 is exposed from the piston 45. Further, the squib 37 is electrically connected to the control device 59 by connecting a connector 42 (refer to two-dotted chain line of FIG. 4) connected with a lead wire 42a extended from the control device 59 to the terminal 37b. The squib 37 is ignited by inputting an operating signal from the control device 59 when operating the actuator A1. Then, the squib 37 injects the driving gas G from the gas injection port 37a by setting off an explosive, not illustrated, included therein.

The piston 45 comprises a cap portion 46 and an operating pin 54. The cap portion 46 is constituted to cover the space by the gas injection port 37a of the squib 37. The operating pin 54 is configured to project forward from the cap portion 46.

The cap portion 46 is extended from around the flange portion 40 surrounding the head portion 39 of the squib 37 to cover the space by the gas injection port 37a of the squib 37. The cap portion 46 is substantially in the shape of a circular cylinder whose axis is in line with the axis of the cylinder case 32 (aligned with the front and rear direction). In the case of the embodiment, the cap portion 46 comprises a cylindrical portion 47 and a front end wall portion 52. The cylindrical portion 47 covers the side of the squib 37 in all directions orthogonal to the axis of the squib 37. The front end wall portion 52 is formed to close the front end side of the cylindrical portion 47. Further, the cylindrical portion 47 includes a large diameter portion 48 in the rear, to the side of the squib 37, and a small diameter portion 49 toward the front end. The small diameter portion 49 is set to be smaller than the large diameter portion 48 with regard to their outer diameter. In the case of the embodiment, the large diameter portion 48 of the cylindrical portion 47 is configured so as to cover the side surface of the flange portion 40 of the squib 37. The small diameter portion 49 is configured so as to cover the side surface of the head portion 39 of the squib 37 and extend forward from the head portion 39. Further, the piston 45 is integrated with the squib 37 by crimping the root portion end 48a of the large diameter portion 48 to contract its diameter at the rear of the flange portion 40 of the squib 37. The large diameter portion 48 is made to be slidable relative to the inner surface 33a of the side wall portion 33 when the piston 45 is moved rearward. Specifically, the outer diameter D1 of the large diameter portion 48 is made slightly smaller than the inner diameter D2 of the side wall portion (refer to FIG. 4). Further, the small diameter portion 49 is constituted to provide a gap P between it and the side wall portion 33 of the cylinder case 32 in all directions orthogonal to the axis of the cylinder. Specifically, the small diameter portion 49 is configured so that its outer diameter D3 is smaller than the inner diameter D2 of the side wall portion 33. The front end wall portion 52 is substantially in the shape of a circular plate and is arranged in a plane orthogonal to the axis of the cylinder case 32. The front end wall portion 52 is arranged to close the front end side of the small diameter portion 49 and to face against the ceiling wall portion 34 of the cylinder case 32.

The operating pin 54 is configured to project forward in the axial direction (front and rear direction) of the cylinder case 32 from the center of the front end wall portion 52. That is, the operating pin 54 is configured in line with the cap portion 46 to make their center axes coincide. In the case of the embodiment, the outer diameter D4 of the operating pin 54 is set to be smaller than the outer diameter of the front end wall portion 52 (coinciding with the outer diameter D3 of the small diameter portion 49) (refer to FIG. 4). In the case of the embodiment, the cap portion 46 and the operating pin 54 are integrally formed by pressing a sheet metal material. Further, the operating pin 54 is formed to be hollow up to its front end face 54a, its wall being continuous with the front end wall portion 52.

Injection holes 52a are formed in the front end wall portion 52 of the cap portion 46, around the operating pin 54. The injection holes 52a are for injecting the driving gas G injected from the gas injection port 37a of the squib 37 into the cylinder case 32. In the case of the embodiment, the injection holes 52a are formed below and above the operating pin 54 symmetrically centering on the operating pin 54. The driving gas G injected from the gas injection port 37a of the squib 37 is temporarily filled in a space S surrounded by the cap portion 46 and the squib 37. Further, through the injection holes 52a, the driving gas G filled in the space S surrounded by the cap portion 46 and the squib 37 is injected into the space between the front end wall portion 52 and the ceiling wall portion 34 inside of the cylinder case 32. The driving gas G is injected in the direction (front and rear direction) of the axis of the operating pin 54 from the injection holes 52a.

A seal ring (O ring) 56 is fitted around the root portion (rear end side) of the operating pin 54. The seal ring 56 comprises a rubber-like elastic member for ensuring airtightness inside of the cylinder case 32. As shown in FIG. 4, the seal ring 56 closes the gap between the operating pin 54 and the opening 34a of the ceiling wall portion 34 in which the operating pin 54 is inserted. Further, the seal ring 56 is configured so as to fill the gap between the ceiling wall portion 34 and the front end wall portion 52. Further, when operating the squib 37, the seal ring 56 prevents the driving gas G injected from the injection holes 52a into the cylinder case 32 from leaking from between the operating pin 54 and the opening 34a before moving the piston 45. Moreover, in the actuator A1 of the embodiment, before being operated, the front end wall portion 52 of the piston 45 is brought into contact with ceiling wall portion 34 of the cylinder case 32 with the seal ring 56 between. Further, by bringing the front end wall portion 52 and the ceiling wall portion 34 into contact with each other, forward movement of the piston 45 before the actuator is operated is restricted. In the case of the embodiment, the seal ring 56 is moved rearward along with the operating pin 54 when the piston 45 is moved rearward.

Further, in the actuator A1 of the embodiment, another seal ring (O ring) 57 is arranged around the side of the small diameter portion 49 of the piston 45. The seal ring 57 also is a rubber-like elastic member for ensuring airtightness inside of the cylinder case 32. The seal ring 57 is arranged by the front of the large diameter portion 48 at the rear end side of the small diameter portion 49 to ensure airtightness between the piston 45 and the side wall portion 33. Specifically, the seal ring 57 closes the gap between the small diameter portion 49 and the side wall portion 33 of the cylinder case 32. Further, the rear side of the seal ring 57 is brought into contact with and supported by the large diameter portion 48 arranged at the rear of the small diameter portion 49.

The actuator A1 of the embodiment is attached to the bag holder 10 with the attaching bracket 12. Further, the actuator A1 and the airbag apparatus M are mounted to the vehicle as follows. First, the folded airbag 21 in which the retainer 6 has been inserted and the inflator 8 are held to the bag holder 10 to the actuator A1 is attached, by fastening the nut 7. At this occasion, the loop portion 28b provided at the belt 28 extended from the flap 27 is projected from the insertion hole 11b formed at the bottom wall portion 11 of the bag holder 10.

Then, the operating pin 54 of the actuator A1 is inserted to the loop portion 28b. Then, the front end 54a of the operating pin 54 is brought into contact with the support piece portion 13 of the bag holder 10 so that the loop portion 28b is held by the operating pin 54. Thereafter, the pad 17 is fastened with the rivet 16 to the bag holder 10, the airbag apparatus M is assembled, and the airbag apparatus M is attached to the steering wheel main body 1 which has been attached to the vehicle. Further, in attaching the airbag apparatus M to the vehicle, the connector 42 connected with the lead wire 42a extended from the control device 59 is connected to the terminal 37b of the squib 37 of the actuator A1. Further, a predetermined lead wire electrically connected to the control device 59 is wired to the inflator 8.

Figure 6A:
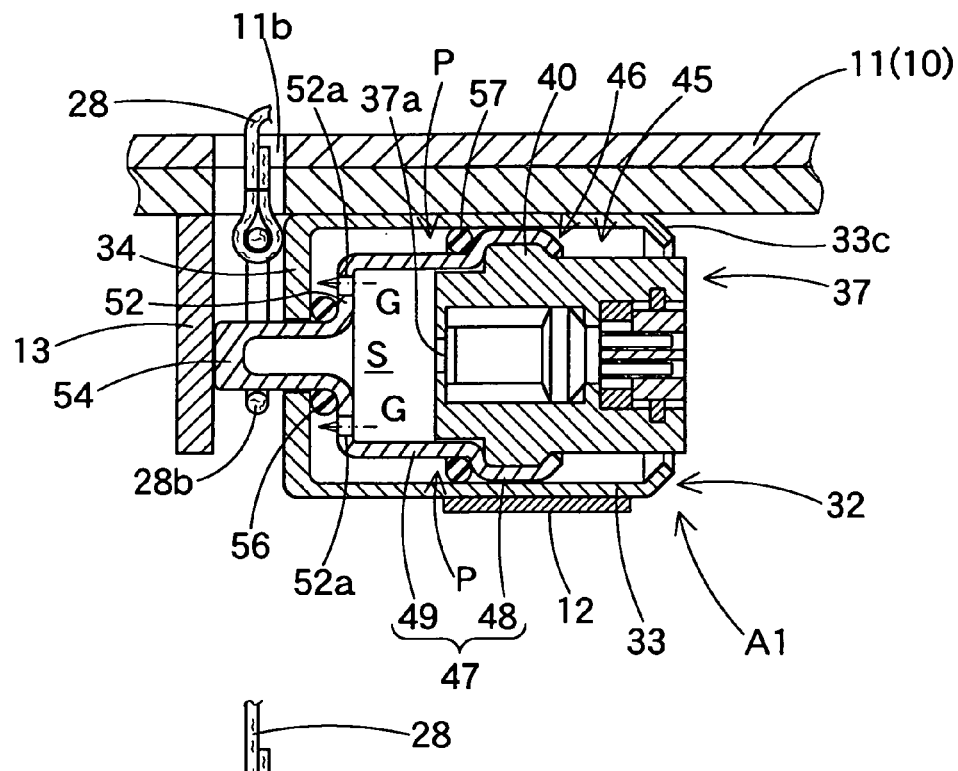
FIGS. 6A and 6B are vertical sectional views showing the states of an actuator of an embodiment before operating and after operating.
Figure 6B:
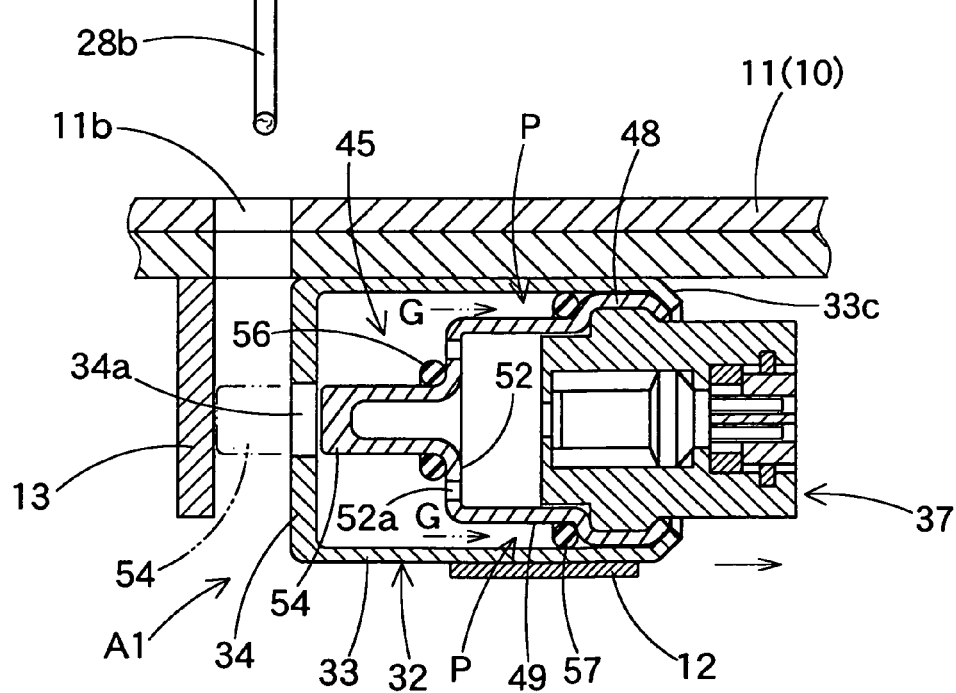

In the actuator A1 of the embodiment, when the squib 37 is ignited by receiving the operating signal of the control device 59, the driving gas G is generated by setting off the explosive inside the squib 37. Then, the driving gas G is temporarily filled in the space S surrounded by the cap portion 46 and the squib 37 in the piston 45. Thereafter, the driving gas G is injected into the cylinder case 32 from the injection holes 52a provided at the front end wall portion 52 of the cap portion 46. The driving gas G filling the inside of the cylinder case 32 presses the front end wall portion 52 of the cap portion 46 of the piston 45 in the rearward direction. Further, the whole piston 45 is moved rearward along the axial direction of the cylinder case 32 by the pressing force of the driving gas G. With the rearward movement of the piston 45, the operating pin 54 is drawn inside the cylinder case 32. At this time, as shown in FIG. 6B, the operating pin 54 is drawn from the loop portion 28b attached to the belt 28 and the operating pin 54 releases the belt 28. Therefore, as shown in FIG. 5C, the flap 27 connected to the belt 28 opens the exhaust hole 25 of the airbag 21 and the inflation gas is exhausted from the exhaust hole 25.

Further, in the actuator A1 of the embodiment, the piston 45 is housed in the cylinder case 32 with its front end wall portion 52 in contact with the ceiling wall portion 34 of the cylinder case 32 with the seal ring 56 between. Therefore, the forward movement of the piston 45 and the operating pin 54 can reliably be prevented before the actuator A1 is operated. Further, in the actuator A1 of the embodiment, when the actuator A1 is operated, the driving gas G injected from the gas injection port 37a of the squib 37 is injected into the space between the front end wall portion 52 and the ceiling wall portion 34 inside of the cylinder case 32 from the injection holes 52a formed around the operating pin 54 of the cap portion 46. Therefore, even when the front end wall portion 52 of the piston 45 is arranged to be brought into contact with the ceiling wall portion 34, the driving gas G can be injected into the space between the front end wall portion 52 and the ceiling wall portion 34 from the injection holes 52a. As a result, the piston 45 can swiftly be moved rearward utilizing the pressure of the driving gas G filled between the cylinder case 32 and the piston 45.

Therefore, with the actuator A1 of the embodiment, forward movement of the piston 45 before the actuator A1 is operated can be reliably prevented, and when the actuator A1 is operated, the operating pin 54 can swiftly be moved rearward.

Further, according to the actuator A1 of the embodiment, the driving gas G injected from the gas injection port 37a of the squib 37 can be injected from the injection ports 52a into the cylinder case 32 in the direction directly facing the ceiling wall portion 34. This can be done because the injection holes 52a are formed at the front end wall portion 52. Particularly, in the actuator A1 of the embodiment, the driving gas G injected from the gas injection port 37a of the squib 37 is temporarily filled in the space S surrounded by the cap portion 46 of the piston 45 and the squib 37. Then, after the gas G fills this space, the gas G is injected into the inside of the cylinder case 32 from the injection holes 52a. Therefore, the direction of flow of the driving gas G injected from the injection holes 52a can be stabilized. That is, the driving gas G is firmly injected from the injection holes 52a toward the ceiling wall portion 34. Therefore, according to the actuator A1 of the embodiment, for moving the operating pin 54 rearward, the reaction force from the injection of the driving gas G can be utilized in addition to the pressure of the driving gas G filling the space between the cylinder case 32 and the piston 45. As a result, in the actuator A1 of the embodiment, the operating pin 54 can be moved rearward faster than in the case where the injection hole is formed at the cylindrical portion of the cap portion.

Figure 7A:
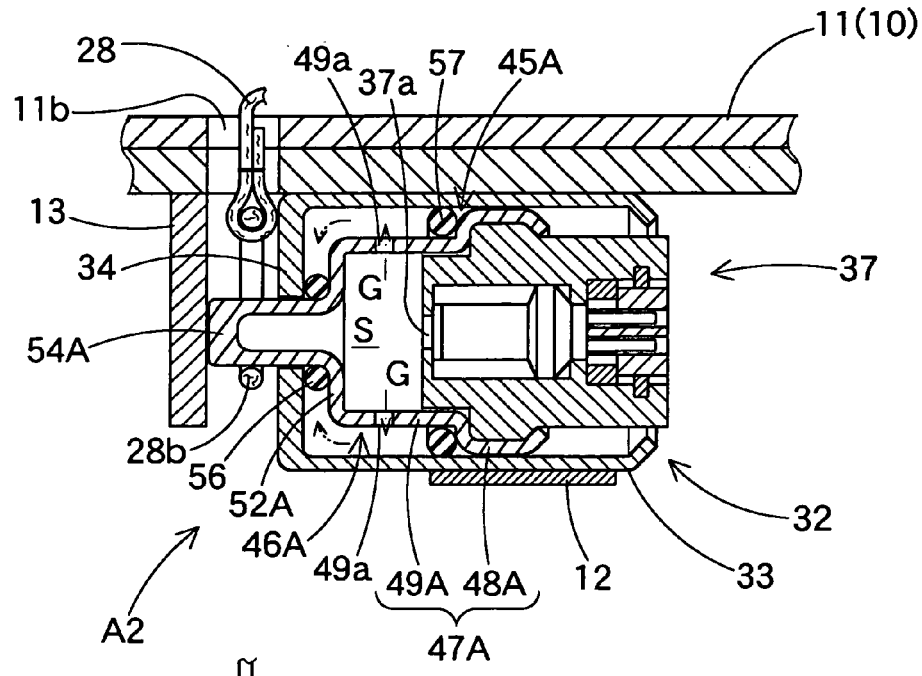
FIGS. 7A and 7B are vertical sectional views showing modified examples of an actuator of an embodiment.
Figure 7B:
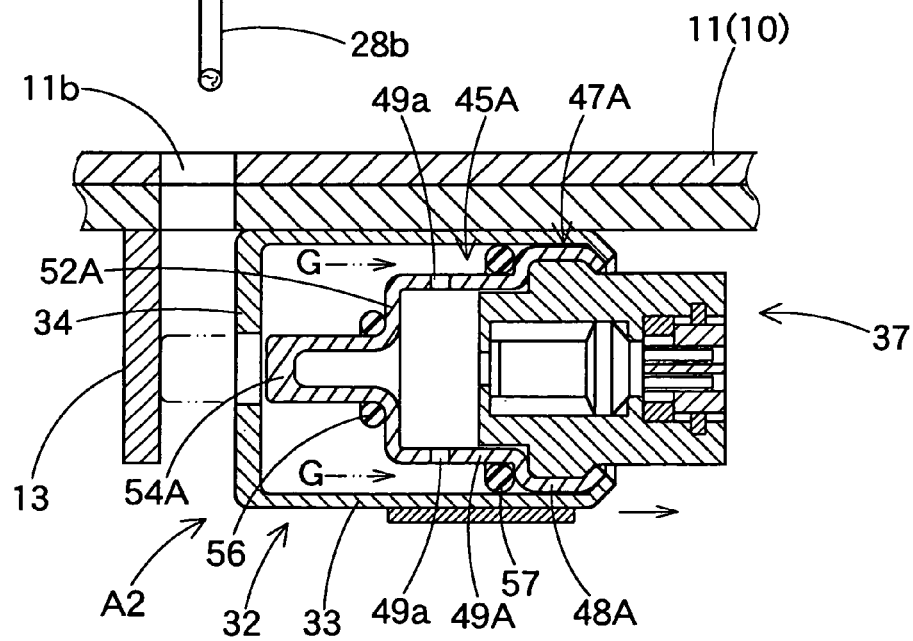

Of course, if the above point is not given importance, an actuator A2 provided with a piston 45A as shown by FIGS. 7A and 7B may be used. According to the piston 45A of the actuator A2, injection holes 49a are arranged at the small diameter side portion 49A of the cylindrical portion 47A of the cap portion 46A. In the actuator A2 which has such a constitution, in operating the squib 37, the driving gas G fills the space S surrounded by the cap portion 46A of the piston 45A and the squib 37 and then is injected into the cylinder case 32 in a direction orthogonal to the axis of the cylinder case 32 from the injection holes 49a, toward the side wall portion 33. However, even in the actuator A2 which has such a constitution, the driving gas G injected from the injection holes 49a of the cylinder case 32 is made to flow inside of the cylinder case 32 toward the space between the front end wall portion 52A and the ceiling wall portion 34. Therefore, the gas G is filled in the space between the front end wall portion 52A and the ceiling wall portion 34 and thus presses the front end wall portion 52A in the rear direction. As a result, as shown in FIG. 7B, the entire piston 45A is moved rearward in the axial direction of the cylinder case 32 by the pressing force of the driving gas G. Therefore, even in the actuator A2 of the above-described configuration, the operating pin 54A can swiftly be moved rearward.

Figure 8A:
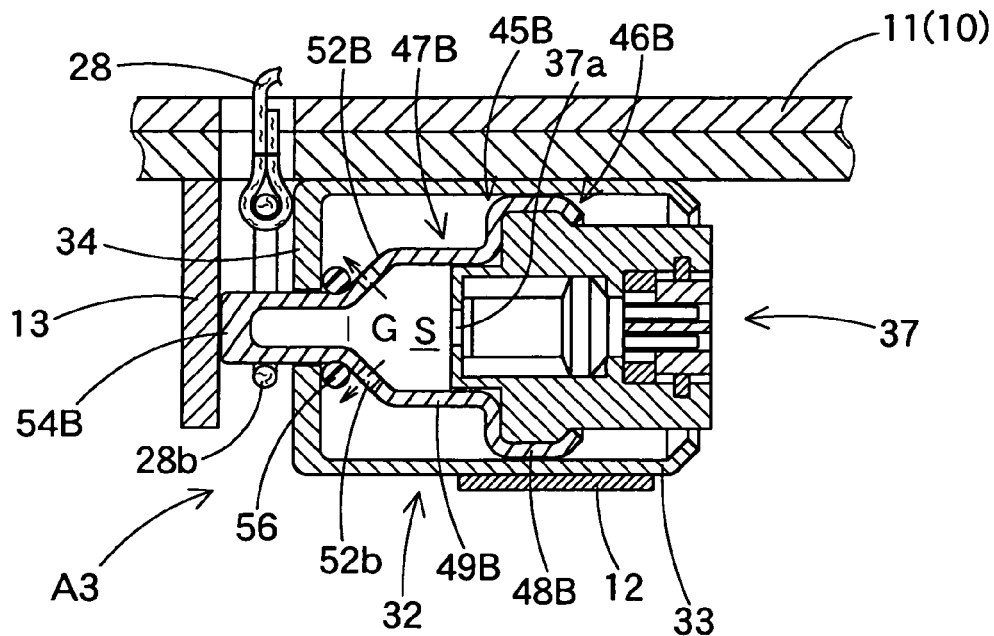
FIGS. 8A and 8B are vertical sectional views showing other modified examples of an actuator of an embodiment.
Figure 8B:
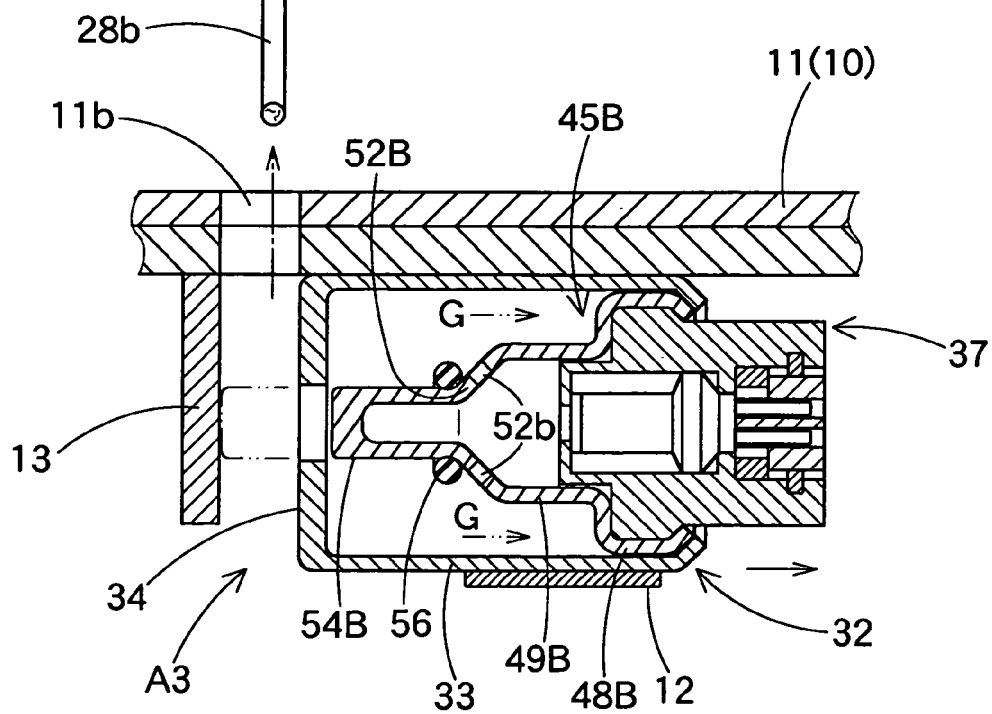

Further, according to the actuator A1 of the embodiment, the driving gas G injected from the squib 37 is injected from the injection holes 52a into the cylinder case 32 in the axial direction of the operating pin 54. In other words, in the actuator A1 of the embodiment, the driving gas G injected from the squib 37 is injected from the injection holes 52a into the cylinder case 32, which thus presses the ceiling wall portion 34 forward along the axial direction of the operating pin 54. This is achieved because the injection holes 52a are configured to inject the driving gas G in the axial direction of the operating pin 54. Therefore, the piston 45 can swiftly be moved rearward away from the ceiling wall portion 34 by reaction force from the driving gas G, and the operation pin 54 can be more swiftly moved rearward. On the other hand, if the above point is not given importance, an actuator A3 which has piston 45B as shown in FIGS. 8A and 8B may be used. In the piston 45B of the actuator A3, the front end wall portion 54B of the cap portion 46B is inclined so as to converge forward, and injection holes 52b are formed at the inclined front end wall portion 52B. According to the actuator A3 which has such a constitution, when the squib 37 is operated, the driving gas G fills in the space S surrounded by the cap portion 45B at the piston 45B and the squib 37, and then is injected into the cylinder case 32 from injection holes 52b substantially orthogonally to the open face of the injection hole 52a (the surface of the front end wall portion 52B). In other words, the driving gas G is injected into the cylinder case 32 from the injection holes 52b obliquely to the axial direction of the cylinder case 32.

Furthermore, in the actuator A1 of the embodiment, the operating pin 54 and the cap portion 46 are formed into an integral unit pressing a metal material. Therefore, the sealing performance of the cap portion 46 of the piston 45 can be improved. Further, in the actuator A1 of the embodiment, the number of parts can be fewer than in the case where the operating pin 54 and the cap portion 46 are formed as separate members. Naturally, if the above point is not given importance, a piston comprising separate operating pin and cap portion members may be used.

Furthermore, according to the actuator A1 of the embodiment, the cap portion 46 is connected to the squib 37 by crimping the cap portion 46 to the squib 37. Therefore, the piston 45 can be connected to the squib 37 by a simple structure. Naturally, if the above point is not given importance, the cap portion may be connected to the squib by separate fastening means such as a screw.

Furthermore, in the actuator A1 of the embodiment, the operating pin 54 is formed to be hollow up to its front end face 54a, its wall being continuous with the cap portion 46. In other words, in the actuator A1 of the embodiment, the cap portion 46 and the operating pin 54 can be formed making their wall thicknesses substantially uniform. Therefore, the actuator A1 can be fabricated by pressing a sheet metal material which has constant plate thickness. As a result, in comparison with the case of fabricating the operating pin 54 by pressing solid over its entire length, the operating pin 54 can easily be fabricated, and fabrication cost can be reduced, which is preferable. Naturally, if the above point is not given importance, the operating pin 54 may be made solid.

Furthermore, in the actuator A1 of the embodiment, the cylindrical portion 47 of the cap portion 46 is constituted to have a large diameter portion 48 and a small diameter portion 49, and a seal ring 57 interposed between the small diameter portion 49 and the side wall portion 33 of the cylinder case 32. Therefore, the airtightness between the piston 45 and the side wall portion 33 of the cylinder case 32 can be ensured. That is, when the squib 37 is operated, the driving gas G can be prevented from leaking between the side wall portion 33 of the cylinder case 32 and the cylindrical portion 47 of the piston 45 due to the improved sealing performance. Further, in the actuator A1 of the embodiment, the gap P is formed in the entire region between the small diameter portion 49 of the cap portion 46 and the side wall portion 33 of the cylinder case 32, encircling the axis of the cylinder case 32. Therefore, the driving gas G injected from the injection holes 52a are made to flow rearward in the gap P between the side wall portion 33 and the small diameter portion 49, which presses the seal ring 57 rearward and in turn moves the piston 45 rearward. However, in the actuator A1 of the embodiment, the rear side of the seal ring 57 is supported by the large diameter portion 48 of the cap portion 46. Therefore, the seal ring 57 is deformed by the pressing force of the driving gas G and is brought into press contact with the side wall portion 33 and the small diameter portion 49. As a result, even when the piston 45 is moved rearward, the seal between the piston 45 and the side wall portion 33 can be maintained well by the seal ring 57.

Further, in the actuator A1 of the embodiment, the seal ring 57 can be arranged around the piston 45 by simply fitting the seal ring 57 around the small diameter portion 49 of the piston 45 and abutting against the large diameter portion 48. Therefore, a recess portion for containing the seal ring 57 need not be formed at the squib or the piston by machining or the like. Further, the seal ring 57 diameter need not be temporarily enlarged for insertion in such a recess portion. Therefore, in comparison with the case where a recess portion for retaining the seal ring is formed at the squib or the piston, the number of fabrication steps and fabrication cost can be reduced. Naturally, if the above point is not given importance, a structure which does not include a seal ring as in the actuator A3 shown in FIGS. 8A and 8B may be constructed. Further, even when a seal ring is provided, there may be a configuration in which the cylindrical portion of the cap portion which has the same outer diameter dimension over its entire length in the axial direction may be formed, and a recessed portion for containing the seal ring is formed by machining or the like separately at the squib or the piston and the seal ring is contained in the recess portion.

Furthermore, in the actuator A1 of the embodiment, the seal ring 56 for sealing the gap between the operating pin 54 and the opening 34a for inserting the operating pin 54 is arranged on the inner face side of the ceiling wall portion 34. Therefore, the gap between the operating pin 54 and the opening 34a of the ceiling wall portion 34 through which is inserted the operating pin 54 is put into a continually sealed state by the seal ring 56 when the actuator A1 is mounted in the vehicle. As a result, durability against humidity and the like is improved. Further, in the actuator A1 of the embodiment, the seal ring 56 can be moved rearward along with the piston 45 when the piston 45 is moved rearward. However, in the actuator A1 of the embodiment, the seal ring 56 closes the gap between the operating pin 54 and the opening 34a before the piston 45 is moved rearward. Therefore, before the piston 45 is moved rearward, the driving gas G injected into the cylinder case 32 from the injection holes 52a can be prevented from leaking from between the operating pin 54 and the opening 34a due to the improved seal performance.

Further, although according to the embodiment, an explanation has been given by taking an example where actuators A1, A2, A3 are used for adjusting the inner pressure in inflating the airbag 21, the use of the actuator of the invention is not limited thereto. For example, in an airbag apparatus of a type for controlling the final shape of the inflated airbag, the actuator of the invention may be used in pulling a restricting member such as a tether for restricting the final shape of the inflated airbag.

What is claimed is:

1. An actuator which has an operating pin, which has the following structure:
   the actuator includes a piston which has an operating pin, a squib which is ignited then generates a driving gas when the actuator is operated, and a cylinder case for holding the piston;
   wherein the piston is connected to the squib and its operating pin projects from its front end;
   wherein the cylinder case includes a side wall portion substantially in a cylindrical shape surrounding the piston, and a ceiling wall portion that closes the front end side of the side wall portion but also allows the operating pin to project outward;
   wherein the piston is configured so that it is moved rearward along with its operating pin by the driving gas generated from the squib and injected into the cylinder case when the actuator is operated;
   wherein the piston comprises a cap portion capable of covering the side of the squib where the squib has a gas injection port;
   wherein the cap portion comprises a cylindrical side portion capable of covering the sides of the squib in all directions orthogonal to the axis of the squib, and a front end wall portion formed to close the front end side of the cylindrical side portion;

wherein the operating pin which is configured to have a diameter smaller than the outer diameter of the front end wall portion is made to project from the center of the front end wall portion of the cylindrical case;

wherein a plurality of injection holes capable of injecting the driving gas from the gas injection port to the space between the front end wall portion and the ceiling wall portion inside of the cylinder case are provided in the cap portion around the operating pin; and wherein the forward movement of the piston before the actuator is operated is restricted by the front end wall portion of the piston coming into contact with the ceiling wall portion of the cylinder case.

2. The actuator which has an operating pin according to claim 1, wherein the injection holes are formed in the front end wall portion.

3. The actuator which has an operating pin according to claim 2, wherein the injection holes are configured to inject the driving gas in the axial direction of the operating pin.

4. The actuator which has an operating pin according to claim 1, wherein the operating pin and the cap portion are formed into an integral unit formed by pressing a metal material.

5. The actuator which has an operating pin according to claim 4, wherein the cap portion is connected to the squib by being crimped to the squib.

6. The actuator which has an operating pin according to claim 4, wherein the operating pin is formed to be hollow up to its front end face, its wall being continuous with the cap portion.

7. The actuator which has an operating pin according to claim 4, wherein the cylindrical side wall portion of the cap portion includes a large diameter portion toward the rear and around the side of the squib, and a small diameter portion toward the front whose outer diameter is set to be smaller than the outer diameter of the large diameter portion;

wherein the small diameter portion has an outer diameter dimension sufficiently smaller than the outer diameter of the side wall portion of the cylinder case that a gap between the small diameter portion and the side wall portion of the cylinder case is provided; and wherein a seal ring is interposed between the small diameter portion and the side wall portion.

8. The actuator which has an operating pin according to claim 1, wherein the inner face side of the ceiling wall portion is provided with a seal ring for sealing the gap between the operating pin and an inserting hole in which the operating pin is inserted; and wherein the piston brings the front end wall portion into contact with the ceiling wall portion by interposing the seal ring.

9. The actuator which has an operating pin according to claim 1, wherein the actuator is utilized for controlling the inner pressure of an airbag of an airbag apparatus mounted to a vehicle.

* * * * *